Patented June 22, 1926.

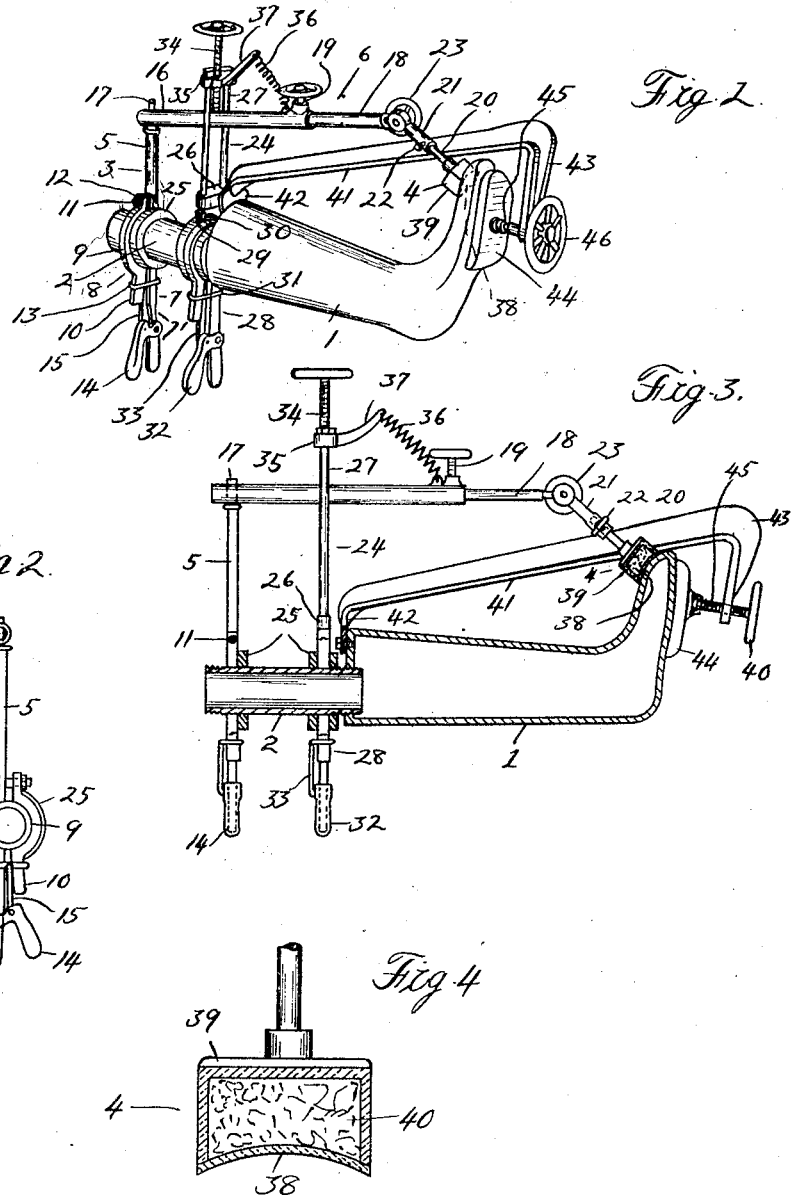

1,589,952

UNITED STATES PATENT OFFICE.

WADE H. FOSTER, OF BAD AXE, MICHIGAN.

VULCANIZING APPARATUS.

Application filed May 14, 1923. Serial No. 638,856.

The invention relates to vulcanizing apparatus and is particularly applicable to apparatus for vulcanizing repair work upon footwear, although it is apparent that the apparatus may be used for vulcanizing repair work upon other articles, such as inner tubes and the like. The invention has among its objects the provision of a vulcanizing apparatus in which the support for the pressure applying member may be positioned either in advance or in rear of the guide for the laterally extending arm of the support which carries the pressure applying member. The pressure applying member may exert pressure alternatively in an upward, downward, or inward direction; the provision of a universally adjustable pressure applying member adapted to cooperate with the work support or mold whereby the former may engage any portion of the surface of the latter; and the provision of a simple form of soft pressure applying pad which is constructed to retain the heat. With these and other objects in view, the invention resides in the novel features of construction and combinations and arrangements of parts as more fully hereinafter set forth.

In the drawings:

Figure 1 is a perspective view of a vulcanizing apparatus embodying my invention;

Figure 2 is an end view thereof showing the upright rod for supporting the rear end of the pressure applying arm;

Figure 3 is a longitudinal section therethrough;

Figure 4 is a central section through one of the pressure applying pads.

As shown in the present instance, the work support 1 is a hollow mold designed particularly for use in vulcanizing repair work upon footwear such as rubber boots. 2 is a pipe connecting into the end of the leg portion of the mold for conducting steam thereinto, the longitudinal axes of the pipe and leg portion being substantially parallel. 3 is the support for the pressure applying member 4 having the upright arm 5 and the laterally extending arm 6. The upright arm is rotatably mounted upon the pipe 2 near its outer end, and is adapted to be clamped thereto in its positions of rotative adjustment. In detail, this arm has the semi-circular portion 7 and the lower end portion 7', the semi-circular portion engaging a side of the pipe. 8 is a clamp for securing the upright arm to the pipe, this clamp having the complementary semi-circular portion 9 and the lower end portion 10. The portions of the upright arm and clamp above the pipe are secured from separation by means of the bolt 11 passing therethrough, and the nut 12 threaded upon the bolt, while the lower end portions of the upright arm and clamp are adjustably moved toward each other by means of the link 13 embracing the same. For moving the link away from the pipe, there is the handle 14 pivoted upon the lower end portion 7' of the upright arm 5 and connected to the link by the rod 15.

The laterally extending arm 6 comprises the rear rod 16 having a transverse aperture through its rear end for engagement in by the reduced upper end 17 of the upright arm 5, there being sufficient clearance for the necessary degree of rocking of the rod relative to the upright arm. The arm also has the forward rod 18 which telescopically engages in the rear rod 16 and is held in both its positions of rotative and longitudinal adjustment by the hand wheel operated set screw 19 upon the rear rod and engageable with the forward rod. The pressure applying member 4 is adapted to cooperate with the mold 1 and has the stem 20 rotatably engaging in the socket 21 and secured thereto by the set screw 22. This socket in turn is pivotally mounted upon the front end of the forward rod 18 to be rotatable about an axis extending transversely thereof and is held in its positions of rotative adjustment by suitable means such as the wheel clamp 23.

24 is a guide rotatably mounted upon the pipe 2 and adapted to cooperate with the laterally extending arm 6. This guide and the upright arm 5 are positioned upon the pipe by means of the collars 25 fixedly secured to the pipe. This guide has the base 26 into which the parrallel rods 27 are preferably threaded, these rods being spaced sufficiently apart to permit of the passage therebetween of the rear rod 16 of the laterally extending arm. The base is clamped to the pipe 2 in its relative positions of rotative adjustment in the same manner that the upright arm 5 is clamped to the pipe, this base having a semi-circular portion engaging one side of the pipe and a lower end portion, the semi-circular portion being frictionally clamped upon the pipe by a clamp 28 having a complementary semi-circular portion secured at the upper side of the pipe by means of the bolt and nut 29 and 30 respectively, and at the lower side of the pipe by means of the link 31 which is adjustable through the handle 32 connected to the link by the rod 33.

34 is a threaded rod engaging the cross bar 35 at the upper ends of the rods 27 and adapted to engage the rear rod 16 to rotate the latter relative to the upright arm 5. 36 is a coil spring connected to the forward end of the rear rod 16 and to the arm 37 upon the cross bar for yieldably maintaining the rear rod in engagement with the threaded member.

As shown particularly in Figure 4, the pressure applying member 4 is a pad and has the concave work bearing surface 38 preferably formed of sheet lead and which is imbedded in one wall of the casing 39 formed of green rubber. This casing incloses the heat retaining body 40 formed of ground cured rubber and ground lead, the proportions of rubber and lead being approximately equal. With this construction, the pad conforms readily to the contour of the work and the heat conducted to the pad will be retained for a considerable period of time due to the composition of the body within the casing.

41 is an arm having a transversely extending rear end 42 pivotally mounted at the end of the leg portion of the mold 1 and having the transversely extending forward end 43 extending beyond the foot end of the mold. 44 is a pad for engaging the sole portion of the work, this pad being clamped thereagainst by the screw 45 threadedly engaging the end 43 and secured to the hand wheel 46. The arrangement of the arm 41 is such that it can be positioned with respect to the mold and pressure applying member that it will not interfere with the latter.

The support 1 may be positioned either to the right or left of the guide 24, i. e., rotatably in advance or in rear of the support, whereby the rod 16 is pinched or clamped between the rods of the guide 24. This prevents side slap or lost motion in the pressure applying member 4, causing the latter to travel more directly in toward the work, preventing slipping of the patch being applied to the boot. Where the support and guide member are without relative movement, i. e., where they rotate together around the pipe 2, I have found that, while the pressure is direct on all parts of the boot in direct line with the laterally extending arm 6, when the member 4 is directed toward the sides of the toe or foot the side slap or lost motion in the guide member and extending arm causes the latter to shift with consequent sliding or rolling of the patch being applied to the boot.

From the above description it will be seen that the support for the pressure applying member and its guide may be readily adjusted around the pipe 2. The support may also be positioned either in rotatable advance or in rear of the guide, whereby pressure may be exerted upon the pressure applying pad in upward, downward or inward directions. Also, that the pad is universally adjustable so that it will fit any portion of the mold surface. Furthermore, that the pad is so constructed that it will retain heat for a considerable period of time, thereby facilitating the vulcanizing of the work, and also so constructed that it will conform to the shape of that portion of the mold being engaged, thereby avoiding cutting the work.

What I claim as my invention is:

1. In a vulcanizing apparatus, the combination with a hollow mold and a pipe for conducting heated fluid thereto, of a pressure applying pad adapted to cooperate with said mold, a support for said pad rotatably mounted upon said pipe, and a guide for said support also rotatably mounted upon said pipe, said support and guide being relatively rotatable.

2. In a vulcanizing apparatus, the combination with a hollow mold, of a relatively movable pressure applying member adapted to cooperate therewith, and a rotatable support for said pressure applying member having its axis of rotation substantially parallel to the longitudinal axis of said mold.

3. In a vulcanizing apparatus, the combination with a mold, and a cylindrical member at one end thereof, of a pressure applying member adjustable longitudinally of said mold, and a support rotatably mounted on said cylindrical member and pivotally connected to said pressure applying member.

4. In a vulcanizing apparatus, the combination with a mold and a cylindrical member at one end thereof, of a transversely extending arm mounted on said cylindrical member, a rod mounted upon said arm, a second rod telescopically engaging said first-mentioned rod, and a pressure applying member adapted to cooperate with said mold and rotatably mounted upon said second-mentioned rod.

5. In a vulcanizing apparatus, the combination with a mold and a pipe for conducting heated fluid thereto, of an arm extending transversely of and rotatably mounted upon said pipe, a pressure applying member adapted to cooperate with said mold, and a longitudinally adjustable arm pivotally connected to said pressure applying member and rotatably mounted upon said transversely extending arm.

6. In a vulcanizing apparatus, the combination with a hollow mold and a pipe at one end thereof for conducting heated fluid thereinto, of a transversely extending arm mounted upon said pipe, a rod rotatably mounted upon said arm, a second rod telescopically engaging said first-mentioned rod, a pressure applying member adapted to cooperate with said mold and pivotally mounted upon said second rod, a guide mounted upon said pipe and embracing said first-mentioned rod, and a threaded member upon said guide for rotating said first-mentioned rod toward said mold.

7. In a vulcanizing apparatus, the combination with a hollow mold and a pipe at one end thereof for conducting heated fluid thereinto, of a transversely extending arm mounted upon said pipe, a rod rotatably mounted upon said arm, a second rod telescopically engaging said first-mentioned rod, a pressure applying member adapted to cooperate with said mold and pivotally mounted upon said second rod, a guide mounted upon said pipe and embracing said first-mentioned rod, a threaded member upon said guide for rotating said first-mentioned rod toward said mold, and a coil spring connected to said guide and first-mentioned rod for maintaining the latter in engagement with said threaded member.

8. In a vulcanizing apparatus, the combination with a hollow mold, and a pipe at one end thereof for conducting heated fluid thereinto, of a pressure applying member adapted to cooperate with said mold, a transversely extending arm mounted upon said pipe, an arm between said pressure applying member and transversely extending arm, and a guide for said last-mentioned arm mounted upon said pipe.

9. In a vulcanizing apparatus, the combination with a hollow mold, of a pipe for conducting heating fluid thereto, of a pressure applying arm extending substantially parallel with the axis of said mold, means for supporting said arm at one end thereof, a pressure applying member adapted to cooperate with the mold, and a stem connecting the pressure applying member and the pressure applying arm, and means for applying a pressure on said arm intermediate its point of support and its point of connection with said stem.

10. In a vulcanizing apparatus, the combination with a hollow mold and a pipe for conducting heated fluid thereto, of a pressure applying arm extending substantially parallel with the axis of said mold, means whereby said arm may be adjusted to a plurality of positions rotatable about the axis of the mold, and a pressure applying member carried by said arm and adapted to cooperate with said mold.

11. In a vulcanizing apparatus the combination with a hollow mold and a pipe for conducting heated fluid thereto, of a pressure applying arm extending substantially parallel with the axis of said mold, means whereby said arm may be adjusted to a plurality of positions rotatable about the axis of the mold, and a pressure applying member carried by said arm and adapted to cooperate with said mold, and means for applying a pressure on said arm intermediate its point of support and its point of connection with said stem.

12. In a vulcanizing apparatus, the combination with a mold, of a pressure applying arm provided with a rod telescoped therewith and projecting therefrom toward said mold, and a pressure applying member carried by said rod and adapted to cooperate with said mold and means engageable with said arm for applying pressure thereto.

13. In a vulcanizing apparatus, the combination with a mold, of a pressure applying arm spaced throughout its length from said mold, means for supporting one end of said arm in spaced relation with the mold, a pressure applying member supported by the other end of said arm in a position for cooperating with said mold and means for applying pressure to said arm at a point intermediate its engagement with the said support and member.

14. In a vulcanizing apparatus, the combination with a mold, of a pressure applying arm spaced throughout its length from said mold, means for supporting one end of said arm in spaced relation with the mold, and a pressure applying member supported by the other end of said arm in a position for cooperating with said mold, and means acting on said rod at a point intermediate its length for applying a pressure to said arm and member.

15. In a vulcanizing apparatus, the combination with a mold, of a pressure applying arm extending substantially longitudinally of said mold, a pressure applying member carried by said arm at one end thereof and adapted for cooperation with said mold, a guide comprising a pair of rods between which said rod passes, and supporting means for the other end of said rod for positioning the latter end rotatably in advance or in rear of the support whereby the said pressure supplying arm is clamped between the said guide rods.

16. In a vulcanizing apparatus, the combination with a mold, of a pressure applying arm extending substantially longitudinally of said mold, a pressure applying member carried by said arm at one end thereof and adapted to cooperation with said mold, a guide comprising a pair of rods between which said rod passes, supporting means for the other end of said rod for positioning the latter end rotatably in advance or in rear of the support whereby the said pressure supplying arm is clamped between the said guide rods, and means carried by the said guide for applying a pressure on said pressure arm.

In testimony whereof I affix my signature.

WADE H. FOSTER.